UNITED STATES PATENT OFFICE.

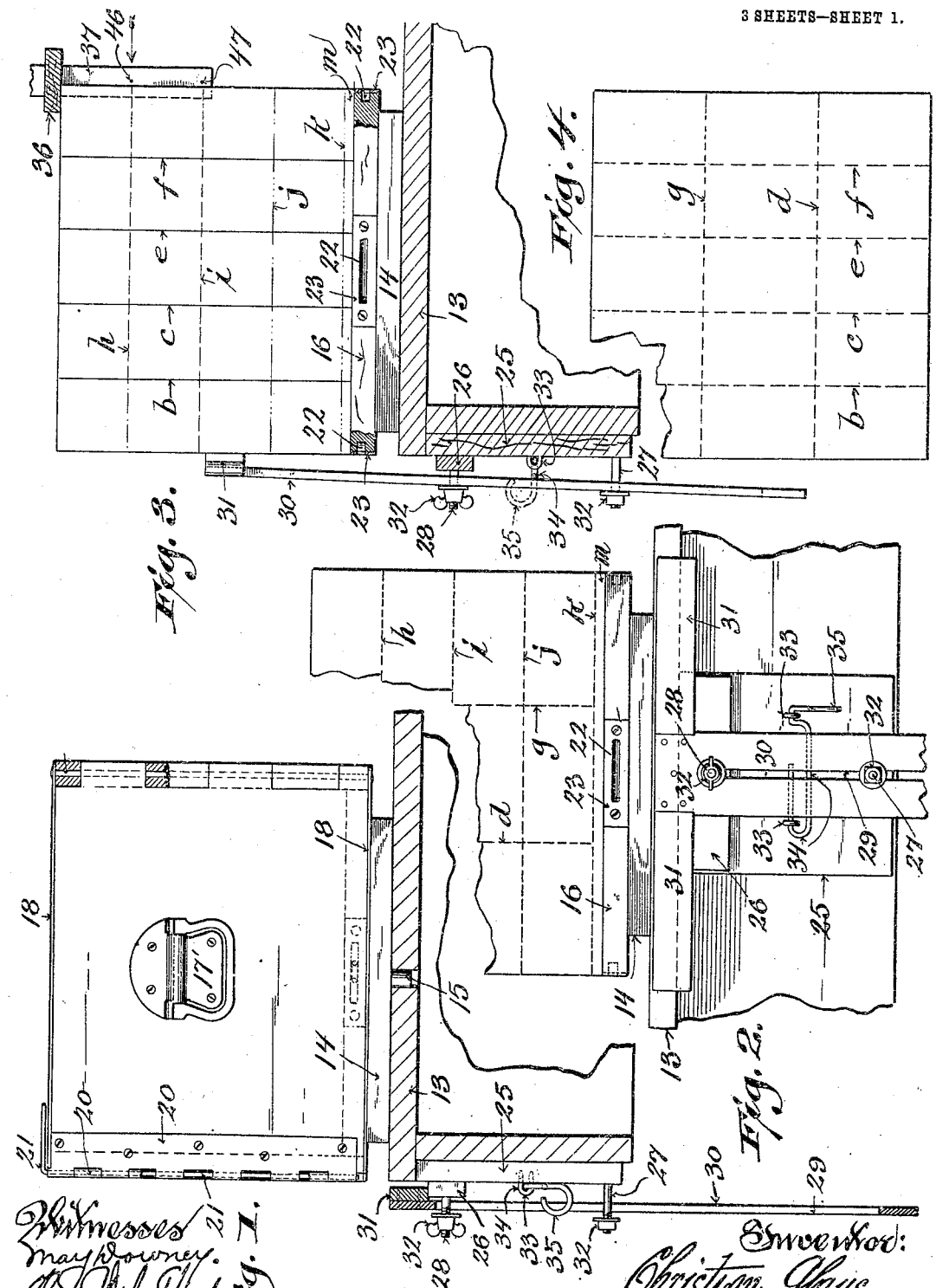

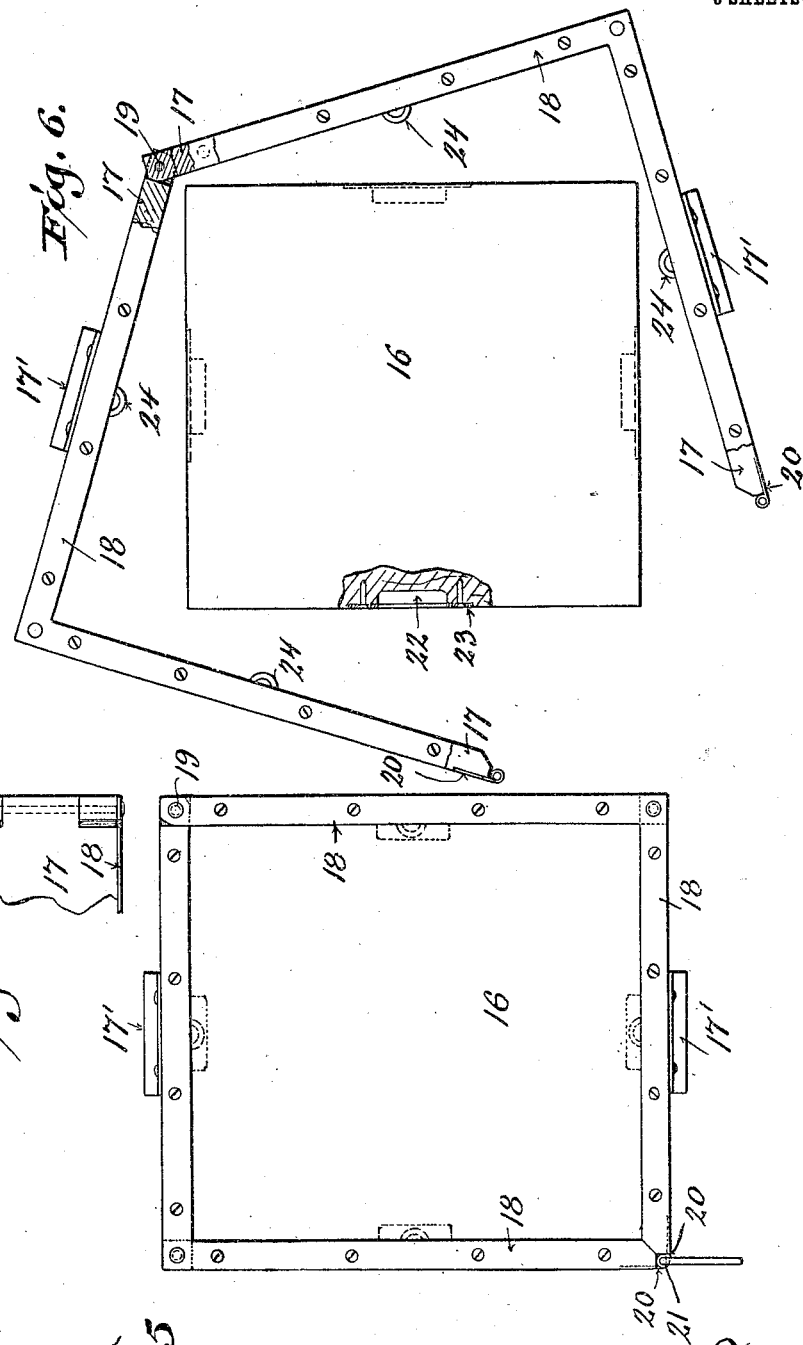

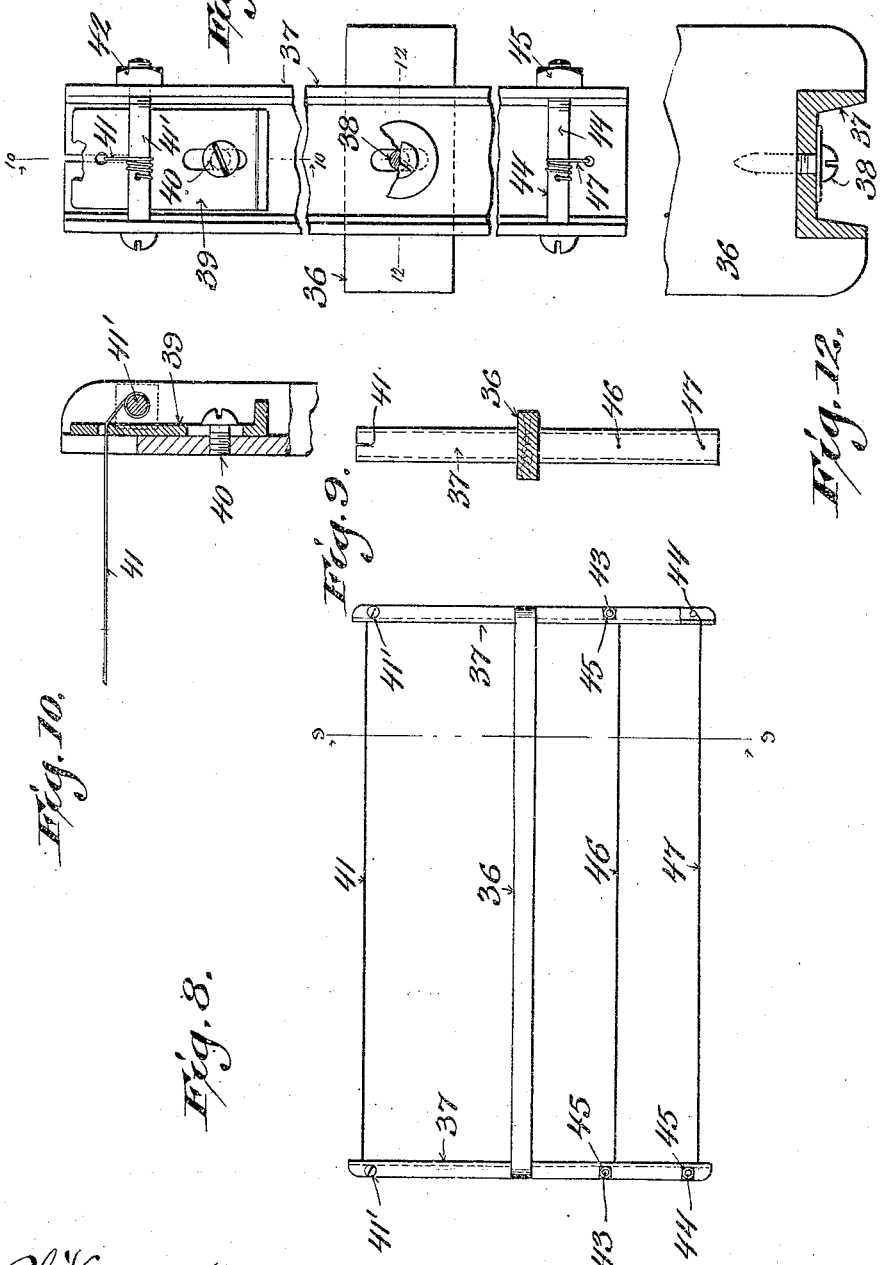

CHRISTIAN GLAUS, OF MILWAUKEE, WISCONSIN.

BUTTER-TREATING APPARATUS.

959,508.  Specification of Letters Patent.  Patented May 31, 1910.

Application filed October 27, 1909. Serial No. 524,926.

*To all whom it may concern:*

Be it known that I, CHRISTIAN GLAUS, a citizen of the United States, and resident of Milwaukee, in the county of Milwaukee and State of Wisconsin, have invented certain new and useful Improvements in Butter-Treating Apparatus; and I do hereby declare that the following is a full, clear, and exact description thereof.

My invention has for its object to facilitate conversion of butter masses of predetermined angular dimensions into angular cakes, commonly termed " prints " each having predetermined angular proportions common to all, and being severally of approximately the same predetermined weight; said invention consisting in what is herein particularly set forth with reference to the accompanying drawings and pointed out in the claims.

Figure 1 of the drawings represents a partly sectional side elevation of a stock-board and butter containing snap-flask, a pivotal block upon which the stock-board is rested, a table supporting the block and a butter stop in adjustable connection with the table; Fig. 2, a front elevation of what is shown in Fig. 1 minus the flask, cutting of the mass of butter on the stock-board into prints being indicated by vertical and horizontal lines; Fig. 3, a view similar to said Fig. 1, except that said flask is removed and a print-cutter illustrated, the cutting of the butter being indicated by full vertical and dotted horizontal lines; Fig. 4, a plan view of the mass of butter from which the flask is removed, a part of said mass being broken away and the cutting of same indicated by dotted crossed lines; Fig. 5, a plan view of the closed flask and mold of butter therein; Fig. 6, a similar view partly in horizontal section illustrating the removal of the flask from the mold; Fig. 7, an elevation of a fragment of the flask; Fig. 8, a side elevation of a preferred form of print-cutter; Fig. 9, a sectional view on the plane indicated by line 9—9 in Fig. 8; Fig. 10, a similar view indicated by line 10—10 in Fig. 11; Fig. 11 represents an end view of a fragment of the aforesaid print-cutter, and Fig. 12 represents a sectional view of said print-cutter on the plane indicated by line 12—12 in said Fig. 11.

Referring by numerals and letters to the drawings, 13 indicates a table, 14 a rectangular block having a depending center pivot 15 that has its bearing in the top of the table. The block 14 serves as a pivotal support for a rectangular stock-board 16 of sufficiently greater surface dimensions to afford clearance on all sides for an angular snap-flask herein specified. The flask is for the most part of wood in two sections, each section preferably comprising two angular walls 17, 17 of said flask at a right angle to one another, the upper and lower edges of said walls being protected by a right-angle metallic strip 18 fastened thereto by counter-sunk screws or other suitable means. Meeting ends of the flask-sections are cut to form knuckles, and the knuckles of each flask-section engage the interstices between the knuckles of the other flask-section, a pintle 19 being engaged with all of said knuckles to thereby form a hinge-joint between said flask-sections. The other meeting ends of the flask-sections, are mitered and provided with outer metallic leaves 20 similar to those of a hinge, and a removable lock-pin 21 is employed in engagement with the knuckles of the leaves when the flask is closed. Handles 17' 17' are provided in connection with opposite walls of the flask.

The stock-board 16 is provided in its edges with sockets 22, and faced with plates 23 having slots therein open to said sockets. The plates and sockets aforesaid are for the engagement of staples 24 with which the sides of the flask are provided, whereby said board becomes the bottom of said flask when the latter is closed thereon.

Projecting from a block 25 on the front of the table 13, below the top of same, and from a cleat 26 on the block are lateral pins 27, 28, that engage a longitudinal slot 29 in the vertical shank 30 of a horizontal stop 31, and a thumb-nut 32 is run on the screw-threaded outer end of each pin. Hung in staples 33 extending from the block 25 is a bail 34 back of the shank of the aforesaid stop, one end of said bail being fashioned to form a handle 35.

The frame of the preferred form of print-cutter, to which reference is had in the foregoing, comprises a broad, flat preferably wooden bar 36, and longitudinally slotted channel-iron rails 37 mortised in the ends of the bar to which they are fastened by set-screws 38 extending through their slots. A longitudinally slotted plate 39 is held in adjusted position in the channel of each rail by means of a set-screw 40 that extends through the plate-slot into the rail. Extending through an eye in each plate 39 and an end notch in the web of the adjacent rail 37 is a wire 41 fast at its ends on bolts 41' that extend through eyes in the flanges of said rails, a clamp-nut 42 being run on each bolt, and one or both of the bolts turned to make taut the wire. Other bolts 43, 44, extend through the flanges of the rails 37 and a clamp-nut 45 is run on each of these bolts. Extending through eyes in the webs of the rails 37 are wires 46, 47, that are made taut on the bolts 43, 44, to which they are fastened. The bar 36 is adjusted and secured a predetermined distance from the wire 46, it being adjustable to compensate for its swell or shrink, and the wire 41 is then adjusted to a predetermined distance from said bar. There is ordinarily a predetermined fixed distance between the wires 46 and 47, but it is practical to provide for an adjustment of the wire 47 similar to the wire 41.

The preferred form of print-cutter herein shown and described is the subject of my application Serial No. 538,398, filed January 17, 1910, as a division of this application.

In practice the butter is packed and slicked off in the closed flask upon the stock-board that for a time constitutes the bottom of said flask, and the whole set upon the table or pivotal block aforesaid, after which the flask is opened and removed from the mold of butter and said work-board. The bar 36 of the print-cutter is now adjusted, if necessary, to the proper distance from the wire 46, and the wire 41 of said cutter is adjusted the proper distance from said bar. To compensate for different densities of butter according to the season of the year, provision will be had for adjustment of the wire 47 and assuming the bar and wires of the print-cutter to be at the proper relative distances apart, in any construction of said cutter, as is shown in Fig. 8, the division of the mold of butter into prints may be effected as follows: By first manipulating the print-cutter to make the vertical cuts $b$, $c$, with the wires 46, 47, the vertical cut $d$ with the wire 41, then the vertical cuts $e$, $f$, with said wires 46, 47 and the vertical cut $g$ with the wire 41, after which the horizontal cuts $h$, $i$, are made with the wires 46, 47, the completed prints removed, and the horizontal cuts $j$, $k$, made with said wires 46, 47 to complete the separation of the mold into prints of predetermined proportion, a residue $m$ of butter in the mold being left upon the work-board to be afterward worked up into another mass of butter. The pivotal block on which the stock-board is rested permits of the mold being turned to suit the convenience of the operator of the print-cutter standing at one side of the table, and is only employed for that purpose. When the horizontal cuts $h$, $i$, of the mold are to be made, the stop 31 is adjusted to the position shown in Fig. 3, or to some other suitable position, and locked in place by a lift of the bail 34, said stop preventing said mold from slipping on the stock-board incidental to the horizontal cutting operation. When the horizontal cuts $j$, $k$, are to be made in said mold, the stop 31 is suitably adjusted and locked in position for the purpose aforesaid, the lift of the bail 34 serving to cramp the shank 30 of said stop against the thumb-nuts 32 on the pins 27 and 28.

By the means above specified, one operative can rapidly separate successive molds of butter into prints of accurate predetermined angular dimensions without tear or waste, this being a matter of importance in the preparation of print butter for the market.

The butter molds may be supported direct upon the table and the cutting effected as above specified, and the molding may be done in a bottomless flask of any suitable construction on said table or other suitable support.

I claim:

1. In a butter-treating apparatus, a stock-board, a snap-flask having detachable connection with the stock-board to encompass the same and therewith form a receptacle in which to mold butter, a support for said board and mold thereon, and a butter stop in connection with the support.

2. In a butter-treating apparatus, a support, a block in pivotal connection with the support, a stock-board designed to rest upon the block this board constituting the bottom of a snap-flask in which to mold butter, and a butter-stop in connection with said support.

3. In a butter-treating apparatus, a support having screw-threaded pins extending therefrom, thumb-nuts run on the pins, a butter-stop having a vertical shank provided with a longitudinal slot engaged by said pins, and a bail arranged in connection with the support to be swung up against the stop-shank and thereby cramp the same in vertically adjusted position against said nuts.

In testimony that I claim the foregoing I have hereunto set my hand at Milwaukee in the county of Milwaukee and State of Wisconsin in the presence of two witnesses.

CHRISTIAN GLAUS.

Witnesses:
 JOHN MEHL, Jr.,
 OSCAR C. MEHL.